United States Patent
Sorotokin et al.

(10) Patent No.: US 8,359,473 B1
(45) Date of Patent: Jan. 22, 2013

(54) SYSTEM AND METHOD FOR DIGITAL RIGHTS MANAGEMENT USING DIGITAL SIGNATURES

(75) Inventors: Peter Sorotokin, Cupertino, CA (US); James L. Lester, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 840 days.

(21) Appl. No.: 12/364,411

(22) Filed: Feb. 2, 2009

(51) Int. Cl.
*G06F 21/00* (2006.01)

(52) U.S. Cl. ........................................ 713/180; 713/193

(58) Field of Classification Search .................. 713/180
See application file for complete search history.

(56) References Cited

U.S. PATENT DOCUMENTS

| | | | |
|---|---|---|---|
| 5,910,987 A | 6/1999 | Ginter et al. | |
| 6,226,618 B1 * | 5/2001 | Downs et al. | 705/51 |
| 6,427,140 B1 * | 7/2002 | Ginter et al. | 705/80 |
| 6,824,051 B2 * | 11/2004 | Reddy et al. | 235/380 |
| 6,891,953 B1 * | 5/2005 | DeMello et al. | 380/277 |
| 6,898,706 B1 * | 5/2005 | Venkatesan et al. | 713/167 |
| 6,948,073 B2 * | 9/2005 | England et al. | 726/32 |
| 7,353,402 B2 * | 4/2008 | Bourne et al. | 713/193 |
| 7,891,011 B1 | 2/2011 | Thenthiruperai et al. | |
| 2006/0100924 A1 | 5/2006 | Tevanian, Jr. | |

OTHER PUBLICATIONS

BBC News, "'Personal data' in iTunes tracks," Jun. 1, 2007, 2 pages.

\* cited by examiner

*Primary Examiner* — Kambiz Zand
*Assistant Examiner* — Dant Shaifer Harriman
(74) *Attorney, Agent, or Firm* — Robert C. Kowert; Meyertons, Hood, Kivlin, Kowert & Goetzel, P.C.

(57) ABSTRACT

Various embodiments of a system and method for digital rights management using digital signatures are described. Various embodiments may include a digital rights management component configured to receive license data including user information and an encrypted decryption key. The digital rights management component may also receive a digital signature and encrypted content data. The digital rights management component may, in response to determining that the digital signature is a valid digital signature of the license data, generate on a device, a message including the user information. The digital rights management component may also perform a key derivation function on the user information to generate a result, generate a decryption key by decrypting the encrypted decryption key with the result of the key derivation function, and decrypt the encrypted content data with the generated decryption key to generate unencrypted content data.

31 Claims, 8 Drawing Sheets

SYSTEM AND METHOD FOR DIGITAL RIGHTS MANAGEMENT USING DIGITAL SIGNATURES

BACKGROUND

1. Field of the Invention

The present invention is directed to computer systems. More particularly, it is directed to digital rights management within a computing environment.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining and consuming content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized individuals.

SUMMARY

Various embodiments of a system and method for digital rights management using digital signatures are described. Various embodiments may include a digital rights management component configured to receive license data including user information and an encrypted decryption key. For instance, such user information may include a user's name or other identifying information for the user. Such encrypted decryption key may be a key corresponding to content (e.g., an e-book, or other digital works) purchased by a user or other entity. The digital rights management component may also receive a digital signature and encrypted content data. The digital rights management component may, in response to determining that the digital signature is a valid digital signature of the license data, generate on a device, a message including the user information. For example, such message might include the user's name or other identifying message. In one example, the message may be displayed as part of an application dialog display or as part of electronic content. The digital rights management component may also perform a key derivation function (e.g., a cryptographic hash function) on the user information to generate a result, generate a decryption key by decrypting the encrypted decryption key with the result of the key derivation function, and decrypt the encrypted content data with the generated decryption key to generate unencrypted content data. In various embodiments, only the correct user information will provide the appropriate decryption key for generating the unencrypted content data. In this way, the digital rights management component may ensure that the user information (as well as other contents of the license) are not tampered with.

Figure 1:
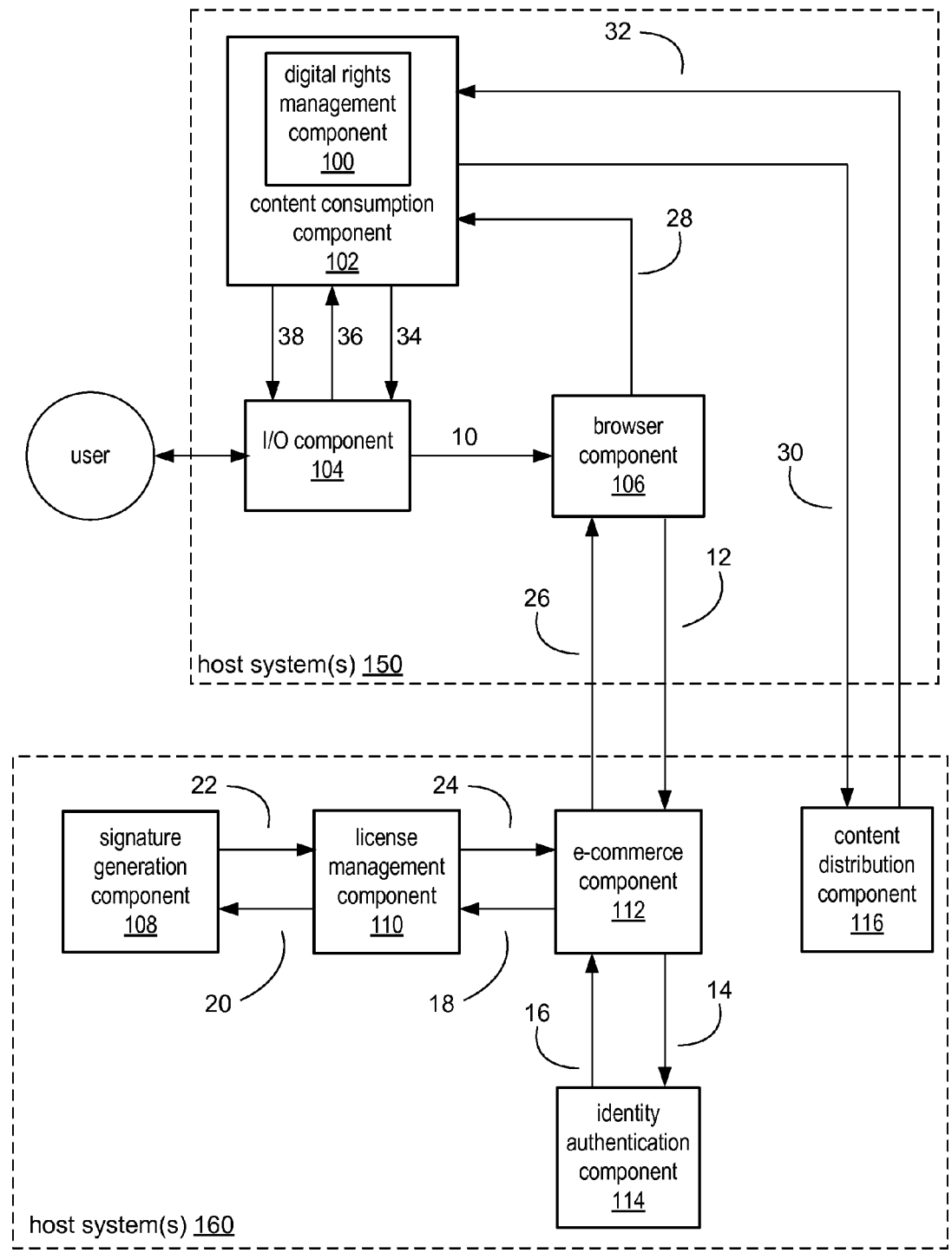
FIG. 1 illustrates a logical representation of the various components of the system for digital rights management using digital signatures, according to various embodiments.

While the system and method for digital rights management using digital signatures is described herein by way of example for several embodiments and illustrative drawings, those skilled in the art will recognize that the system and method for digital rights management using digital signatures is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for digital rights management using digital signatures as defined by the appended claims. Any headings used herein are for organizational purposes only and are not meant to limit the scope of the description or the claims. As used herein, the word "may"

is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

INTRODUCTION

Various embodiments of a system and method for digital rights management using digital signatures are described. The system and method for digital rights management using digital signatures may include a digital rights management component configured to evaluate the validity of content licenses as well as provide access to content associated with successfully validated licenses. In various embodiments, the digital rights management component may be configured to process digital content licenses that include user information (e.g., a name) associated with the user to which the content is licensed and ensure that such content cannot be consumed (e.g., viewed, played, etc.) on a device without a message that includes such user information (or some derivation thereof) being generated on the device. In some embodiments, the digital rights management component may construct the message such that a user is required to answer a question about the user information and/or their identity prior to viewing the content, as described in more detail herein. In this way, if licensed content were to be accessed by a user that is not licensed to access the content, the user would be forced to view the name of the licensed individual (or some other user information) or, alternatively, be forced to view and answer a question including such user information.

The above-described digital rights management techniques may protect licensed content in a variety of ways. For instance, a user may be less prone to sharing licensed content with unlicensed individuals since sharing such content may effectively require the licensed user to reveal their user information to the unlicensed individuals (in accordance with the operation of the digital rights management component, as described above). Additionally, unlicensed individuals that obtain content licensed to others may decide not to consume the content upon being notified that the content is licensed to another individual. In many cases, the forced presentation of user information upon a content access attempt (as described above) may serve as a deterrent to both the sharing of content with unlicensed individuals and the consumption of content licensed to other individuals.

In various instances, this detailed description may refer to content (which may also be referred to as "content data," "content information" or simply "data" or "information"). In general, content may include any information or data that may be licensed to one or more individuals (or other entities, such as business or group). In various embodiments, content may include electronic representations of text and/or graphics, which may include but is not limited to data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe Photoshop (.PSD) format or some other format for electronically storing text, graphics and/or other information whether such format is presently known or developed in the future. In various embodiments, content may include electronic representations of music or other audio, which may include but is not limited to data files adhering to the MPEG-1 Audio Layer 3 (.MP3) format, Adobe Sound Document (.ASND) format or some other format configured to store electronic audio whether such format is presently known or developed in the future. In various embodiments, content may include electronic representations of videos, movies, or other multimedia, which may include but is not limited to data files adhering to Adobe Flash Video (.FLV) format or some other video file format whether such format is presently known or developed in the future. In some embodiments, content may include any combination of the above-described examples.

In various instances, this detailed disclosure may refer to consuming content or to the consumption of content, which may also be referred to as "accessing" content, "viewing" content, "listening" to content, or "playing" content. In some cases, the particular term utilized may be dependent on the context in which it is used. For example, consuming an e-book may also be referred to as viewing or even reading the e-book. Similarly, consuming audio may also be referred to as listening to or playing the audio. In another example, consuming video may also be referred to as viewing or playing the video.

In various instances, this detailed description may refer to a device on which content may be consumed. In various embodiments, such a device may include but is not limited to a computing system (e.g., a desktop or laptop computer), an e-book reader, a digital audio player (e.g., an MP3 player), a personal digital assistant (PDA), a mobile phone, a smartphone, a digital photo frame, or any other device or system configured to access, view, read, write, and/or manipulate any of content data described herein.

In various instances, this detailed description may refer to a cryptographic hash function (or simply "hash function). The hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of these hash functions. In various embodiments, any of the hash functions described herein may be substituted with a more generalized key derivation function. Key derivation functions may include one or more iterations or instances of such hash functions as well as other cryptographic operations in order to generate an encryption or decryption key. Examples of key derivation function may include but are not limited to any key derivation functions specified by Public Key Cryptography Standards (PKCS) (e.g., PKCS-5) or Adobe Password Security.

Digital Rights Management Using Digital Signatures

Figure 7:
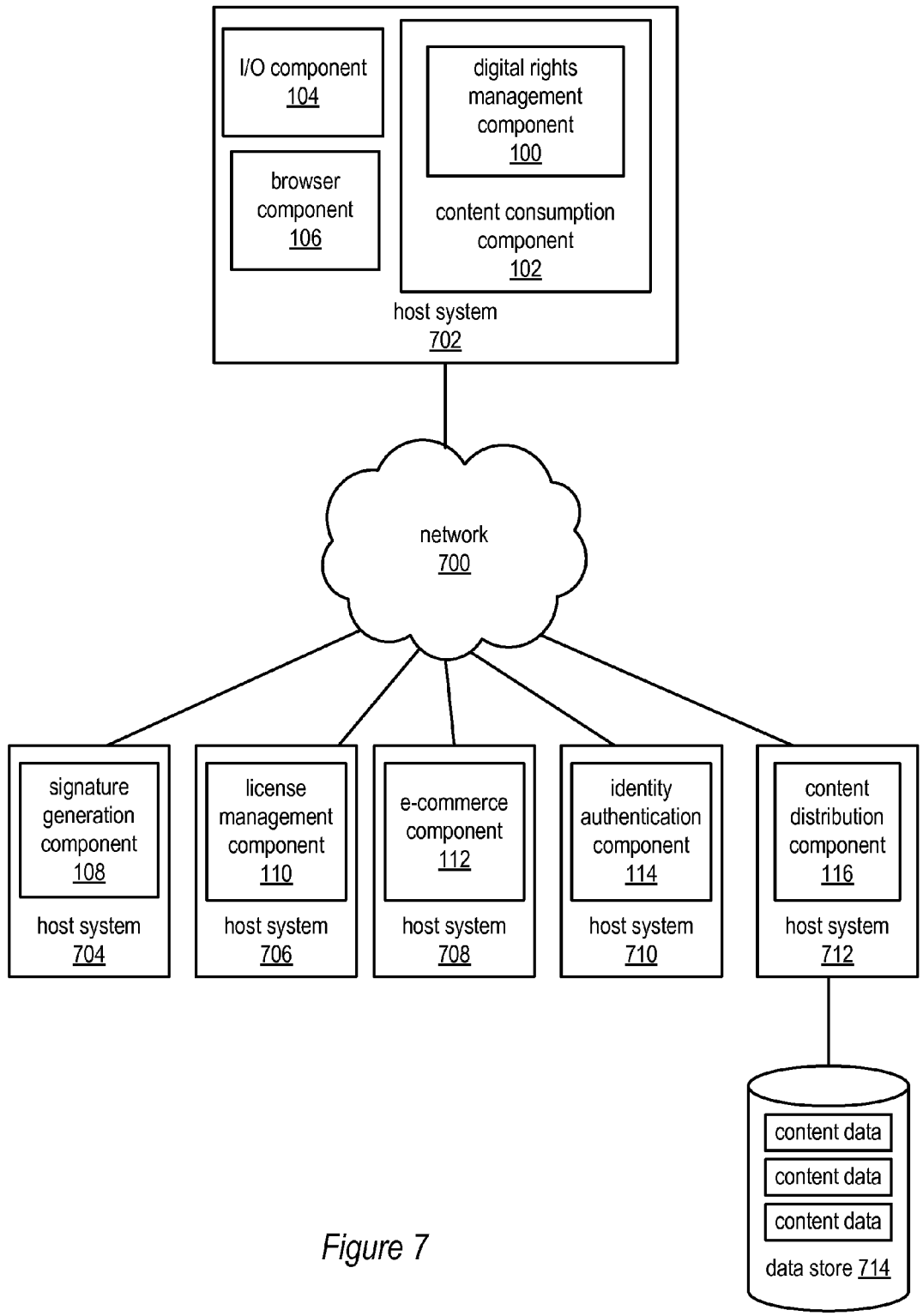
FIG. 7 illustrates a block diagram of one example of a system configuration, according to various embodiments.
Figure 8:
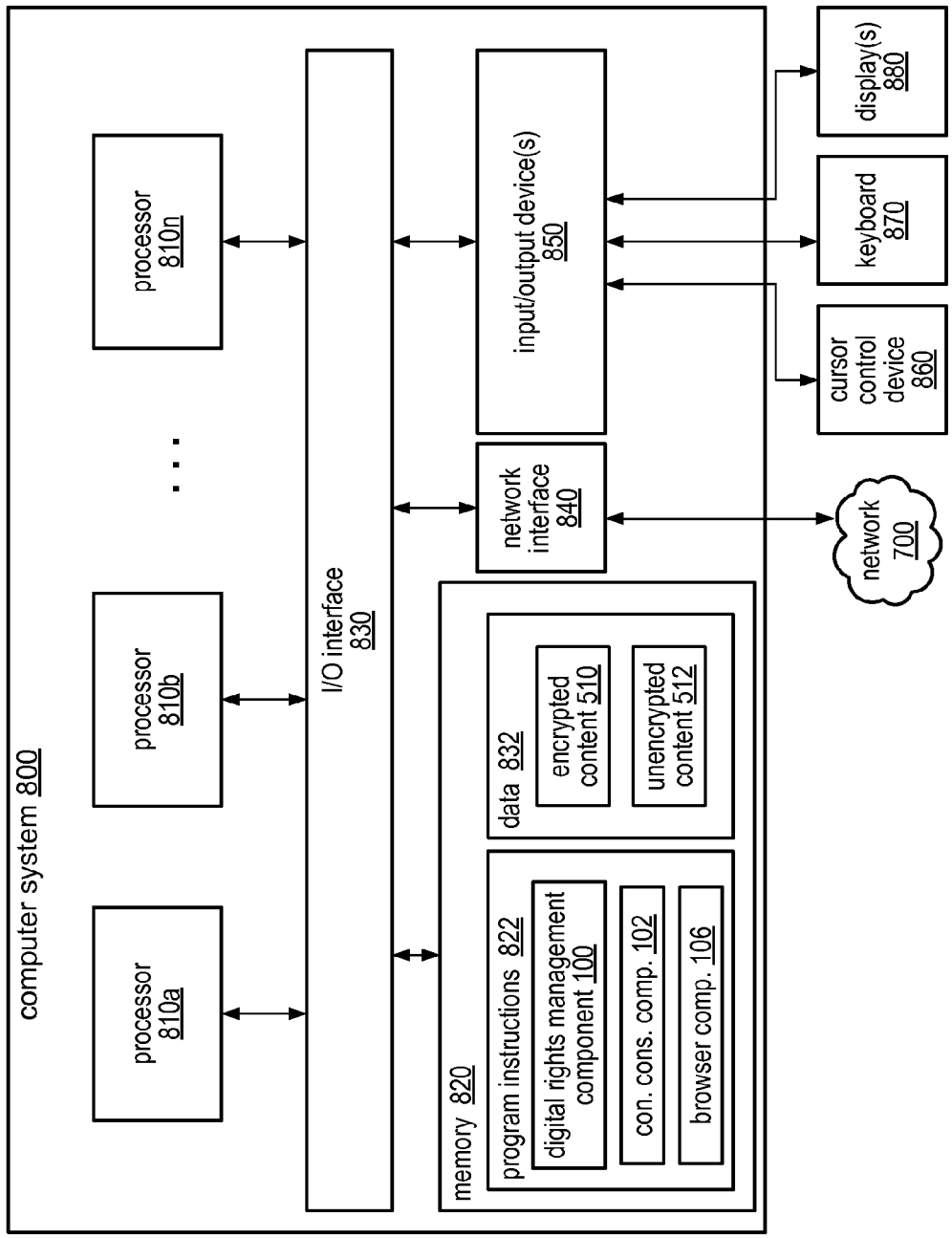
FIG. 8 an example computer system configured to implement various elements of the system and method for digital rights management using digital signatures, according to various embodiments.

FIG. 1 illustrates a logical representation of data flow in a system including a digital rights management component, such as digital rights management component 100. The various elements of FIG. 1 may be components of a variety of devices or computer systems; such devices and/or systems are generally illustrated as host system(s) 150 and host systems(s) 160. For example, in one embodiment, each of the elements of FIG. 1 may be components of separate host systems. In other embodiments, groups of such elements may be implemented on a single host system. One example of a particular system configuration is illustrated in FIG. 7, which is described in more detail below. Additionally, one example of a host system (such as host system to implement host system(s) 150 and/or host systems(s) 160) is illustrated in FIG. 8, which is described in more detail below. In various embodiments, any element of FIG. 1 may be implemented in hardware (e.g., an Application Specific Integrated Circuit), software (e.g., program instructions stored on memory and executable by one or more processors), or some combination thereof. Furthermore, communications between elements of FIG. 1 may take place over dedicated communication lines, one or more computer networks (e.g., the Internet) (examples of such networks are described in more detail with respect to FIG. 7), or some combination thereof. Also note that FIG. 1 includes a plurality of directional data flows (denoted by an arrowhead); however, such directional data flows illustrate only a general direction of relevant data flow. In some cases, such flows may include bidirectional communication that do not necessarily travel in the illustrated direction (e.g., an acknowledge signal that confirms the receipt of a data packet). Generally speaking, the description of FIG. 1 is intended to demonstrate the functional characteristics of the various illustrated elements; this description is not intended to limit the implementation of such elements to any single system or device.

One example of data flow in the illustrated system is described herein. For clarity of description, the illustrated digital rights management component 100, the content consumption component 102, input/output (I/O) component 104 and browser component 106 may be described as implemented on the same host system (e.g., a desktop or laptop computer system). However, it should be noted that various embodiments are not limited to such configuration. For instance, in other embodiments, content consumption component 102 may be implemented on a host system (e.g., e-book reader) separate from a host system (e.g., a desktop or laptop computer) that implements browser component 106.

Input/output component 104 may include logic for communicating with various input and output devices (not illustrated), such as a text entry device (e.g., a keyboard), a pointing device (e.g., a mouse, touch screen surface, or stylus), a display device (e.g., a computer monitor), or some other device configured to transmit or receive data from a host system. In some embodiments, the input and output devices to which I/O component 104 is configured to communicate may accept input from or deliver output to a user.

The data flow described herein may begin with I/O component 104 providing input 10 to browser component 106, which may in general be any component configured to communicate with other computer systems. One example of a browser component 106 may include a network-based browser (e.g., a web browser) configured to retrieve data from a network (e.g., retrieving web pages or other data from the Internet). In various embodiments, input 10 may include data necessary for acquiring content (e.g., e-books, music, videos, etc.) over a network. For instance, such input may include a web address of a web-based retailer's website (e.g., an online bookstore), one or more indications to purchase or otherwise acquire content, and/or transaction information such as a credit card number or other account from which funds may be withdrawn. Browser component 106 may perform the necessary communications to carry out content acquisition as illustrated by data flow 12, which is transmitted to an e-commerce component 112. In one embodiment, e-commerce component 112 may be configured to host an e-commerce website, provide a product or content catalogue (e.g., a listing of available e-books, music, movies, etc.), and carry out a transaction for purchasing such content. In the illustrated example, data flow 12 may include data for the purchase of content from a retailer controlling e-commerce component 112 (e.g., an indication of which content to purchase and payment instructions).

In the illustrated embodiment, e-commerce component 112 may perform an authentication of the identity of a user (e.g., a user requesting content through browser component 106) to determine user information that may be embedded (e.g., included) within a license for the content to be acquired by host system(s) 150. As illustrated by data flow 14, e-commerce component 112 may request a verification of the user's identity or some other user information associated with the user. Identity authentication component 114 may provide to e-commerce component 112 a response 16 that indicates one or more portions of user information that have been verified as authentic. Such user information may include but is not limited to a user's name, address, phone number, workplace, occupation, affiliations, a transaction number or code identifying the purchase of the content, some combination thereof, or some other information from which the identity of the user acquiring content may be determined or derived.

In one particular example, identity authentication component 114 may be a component controlled by a credit card issuer. In this example, data flow 14 may include credit card information (e.g., credit card number, expiration date, etc.) and other information associated with the user and a transaction for acquiring content (e.g., the user's name, the monetary value of the transaction, etc.). The credit card issuer, via component 114, may determine whether the credit card information is valid and provide a result of such analysis to e-commerce component 112 as data flow. For example, if data flow 16 indicates the user's purchase is approved, e-commerce component may interpret such indication as a validation of the user's name or identity. In other embodiments, e-commerce component 112 may acquire user information associated with the user that is requesting content through other verification methods.

Figure 2:
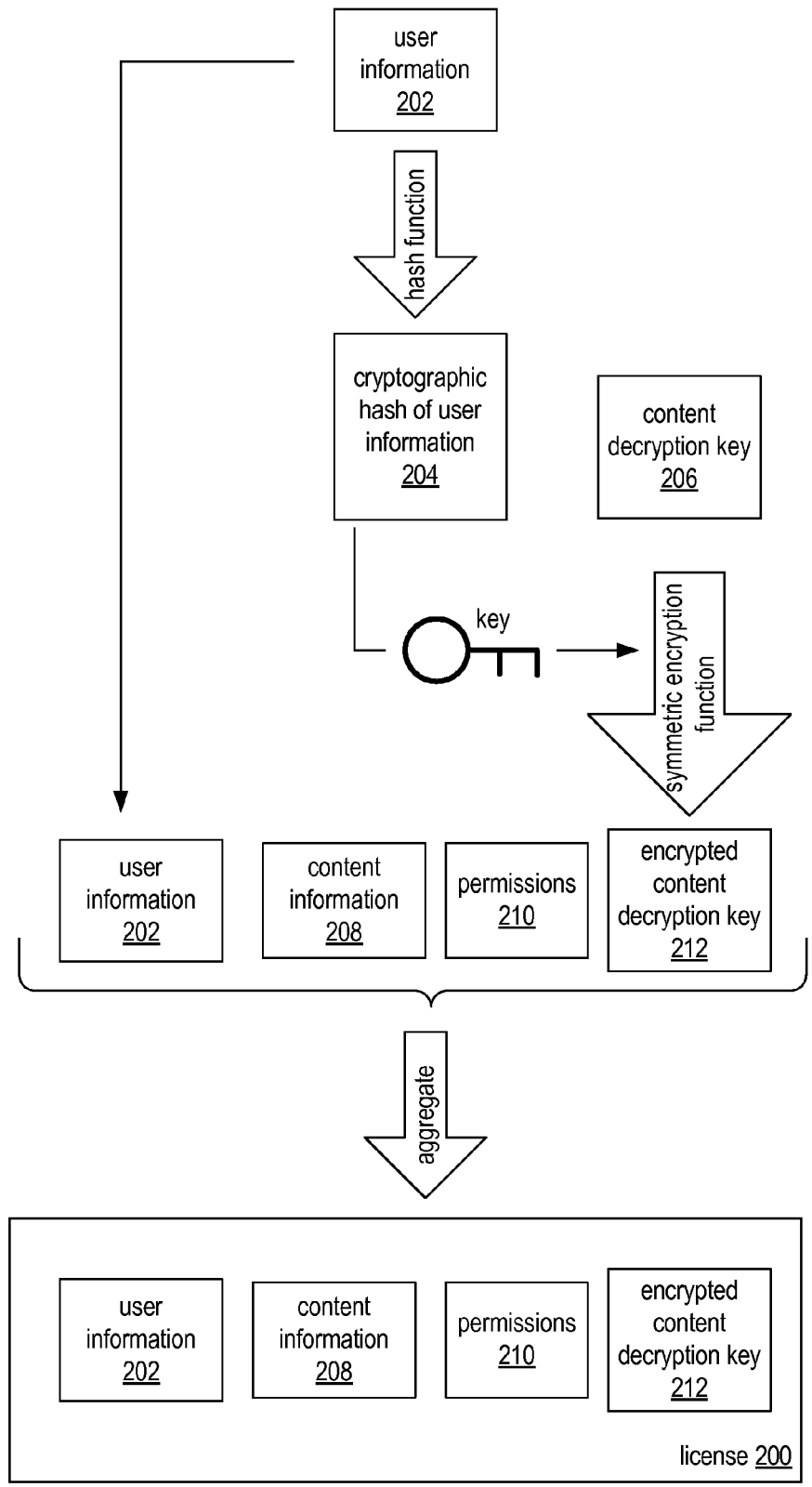
FIG. 2 illustrates a flow diagram for generating a content license, according to various embodiments.

E-commerce component 112 may transmit one or more portions of the determined user information to license management component 110, as illustrated by data flow 18. In various embodiments, license management component 110 may be configured to generate a license for the content from the user information. FIG. 2 illustrates one example of how license management component 110 may generate a license according to various embodiments. As illustrated, license management component 110 may be configured to perform a cryptographic hash function on the user information describe above. For instance, license management component may perform a SHA-1 hash of the user's name. The result of this operation is illustrated as cryptographic hash of user information 204. The license management component may be configured to perform a symmetric encryption function on a decryption key for the content (in various embodiments, content is delivered to a user's device in encrypted form). Examples of a symmetric encryption function include ciphers such as Twofish, Serpent, Advanced Encryption Standard (AES), Blowfish, CASTS, RC4, TDES, IDEA, some combination thereof or any other cipher whether currently known or developed in the future. In the illustrated embodiment, the symmetric encryption function may be configured to utilize the hash 204 as the encryption key of the function; the symmetric key function performed by the license management function may encrypt the content decryption key 206 with the key (i.e., hash 204) to generated an encrypted version of the content decryption key, which is illustrated as encrypted content decryption key 212. In other embodiments, other encryption functions (e.g., asymmetric encryption functions, such as Public-key cryptography) may be utilized.

As illustrated in FIG. 2, data representing the encrypted content decryption key 212, user information 202, content information 208, and permissions 210 are aggregated into a license file or token illustrated as license 200. In various embodiments, content information 208 may generally include any information that indicates the content for which the license applies, which may include but is not limited to a content identifier (e.g., an alphanumeric string), a Stock Keeping Unit (SKU) of the electronic content, or some other information that identifies the content. In some embodiments, content information may specify a memory location or network location at which the content is located, which may include but is not limited to Uniform Resource Locators (URLs), Uniform Resource Names (URNs), or some other Uniform Resource Identifier (URI). Permissions 210 may specify one or more restrictions on the content or specify how the content may be consumed. For example, permissions may specify who can access the content (e.g., an individual or group) and/or how the content may be viewed, listened, played, copied, pasted, cut, shared or otherwise utilized. The permissions may also specify a period of time for which the license is valid.

Returning to FIG. 1, license management component 110 may transmit the generated license (e.g., license 200) to signature generation component 108, as illustrated by data flow 20. Signature generation component 108 may be configured to digitally sign license 200 with a private key. In various embodiments, this private key is secret and only known to the entity controlling signature generation component 10. As described in more detail herein, the signature generation component may be configured to generate a public key that forms a public key—private key pair with the aforesaid private key, which may in various embodiments mean that digital signatures created with the private key may be validated with public key. Note that only the private key can create such digital signatures. An example of operations performed by the signature generation component to generate a digital signature of license 200 is illustrated in FIG. 3.

Figure 3:
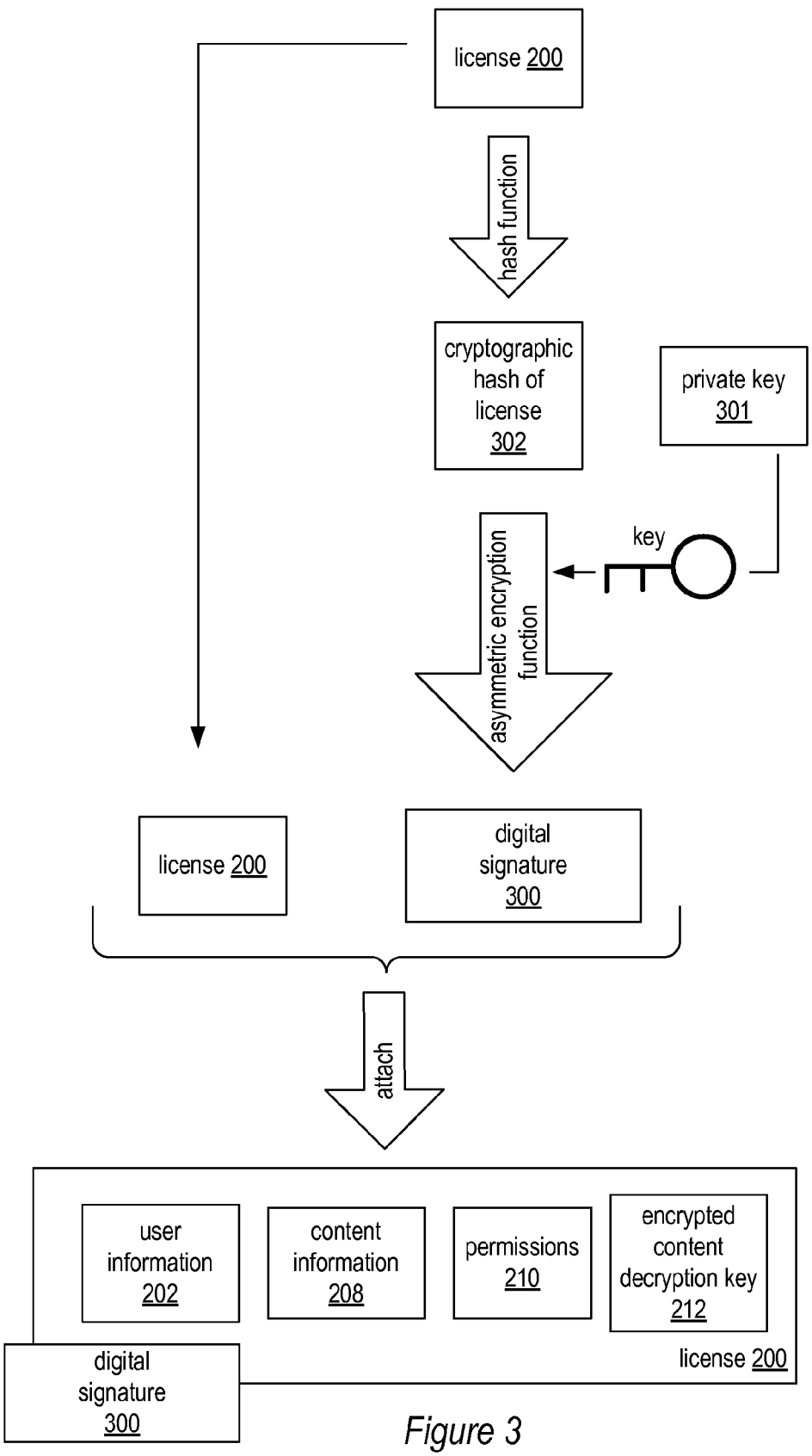
FIG. 3 illustrates a flow diagram for digitally signing a content license, according to various embodiments.

As illustrated in FIG. 3, the signature generation component may be configured to perform a cryptographic hash function (e.g., SHA-1) on license 200. The result of such operation is illustrated as cryptographic hash of license 302. The signature generation component may be configured perform an asymmetric encryption function on hash 302 to generate a digital signature. In various embodiments, performing an asymmetric encryption function on hash 302 may include encrypting hash 302 with a private key 301, which may be the private key that the signature component may hold as a secret as described above. The result of this encryption process is digital signature 300, which may be validated with a public key that forms a private key—public key pair with private key 301 (e.g., the private key and public key may be generated as a pair by a key derivation function performed by the signature generation component). Signature generation component 108 may be configured to provide such public key to other host systems within a digital certificate, such as an X.509 certificate in Public Key Infrastructure (PKI) systems. Such digital certificates may also be distributed by a trusted third party that can verify the public key is a valid public key of the signature generation component or an entity controlling such component. As demonstrated by the illustrated embodiment, the signature generation component may be configured to attach the generated digital signature 300 to license 200 (e.g., as metadata). Returning to FIG. 1, the signature generation component may be configured to provide the license 200 the digital signature 300 of the license to license management component 110, as illustrated by data flow 22. In an alternative embodiment, signature generation component 108 may be configured to provide license management component with only the generated digital signature 300. For instance, since the license management component may already have knowledge of license 200 (e.g., since it is the component that generated the license), network bandwidth may be conserved by having digital generation component 108 configured to only transfer the digital signature back to license management component 110, according to some embodiments.

License management component may provide the digitally signed license (i.e., license 200 and digital signature 300) to e-commerce component 112, as illustrated by data flow 24. E-commerce component 112 may be configured to provide the digitally signed license to browser component 106 (as illustrated by data flow 26), which in turn may provide the digitally signed license to content consumption component 102 (as illustrated by data flow 28). Content consumption component 102 may include any component configured to consume the purchased content. For instance, content consumption component 102 may be an e-book reader, a document viewer or editor, a media player, or some other application configured to view, edit, modify, play, or otherwise consume acquired content.

In various other embodiments, the digitally signed license (as well as the corresponding electronic content) may be obtained through sources other than e-commerce component 112. For example, in some embodiments, content consumption component 102 may be configured to communicate with a point-of-sale terminal at a retail location (e.g., a bookstore) to obtain a digitally signed license and corresponding content. Such a terminal may be configured to communicate with the various elements illustrated in FIG. 1 to fulfill a customer order for electronic content (e.g., an e-book).

Figure 4:
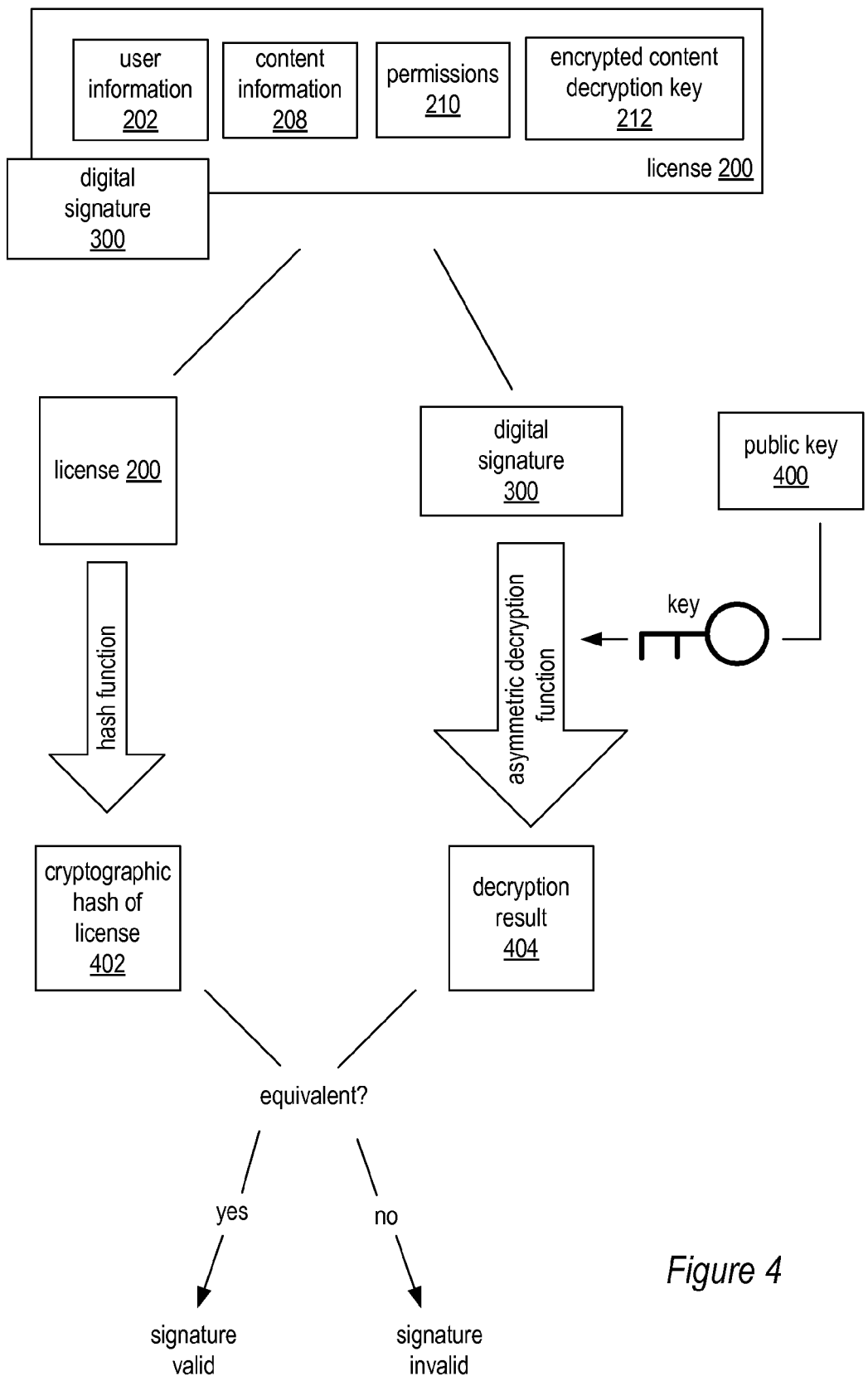
FIG. 4 illustrates a flow diagram for determining whether a digital signature of a content license is valid, according to various embodiments.

Digital rights management component 100 may be configured to process the digitally signed license. In various embodiments, the digital rights management component may first determine whether digital signature 300 is a valid signature of license 300. If the digital signature is valid, the digital rights management component may determine with certainty that the license is a license that was signed by signature generation component 108. FIG. 4 illustrates the manner in which digital rights management component 100 may determine whether digital signature 300 is a valid signature of license 300, according to some embodiments.

As illustrated by FIG. 4, the digital rights management component may begin the process of verifying the digital signature by parsing the digitally signed signature into license 200 and digital signature 300. (In some cases, the digital signature and license may already be separate and parsing may not be necessary.) The digital rights management component may perform a hash function (e.g., SHA-1) on license 200, the result of which is illustrated by cryptographic hash of license 402. In various embodiments, the digital rights management component utilizes the same hash function as utilized by the signature generation component as described above in regard to FIG. 3. The digital rights management component may also be configured to perform an asymmetrical decryption function on digital signature 300 by decrypting the digital signature 300 with a public key 400. In various embodiments, public key 400 may be the public key that corresponds to private key 301 described above with respect to FIG. 3 (e.g., the private key 301 and public key 400 may be generated as a pair by a key derivation function performed by signature generation component 108). In various embodiments, public key 400 may be obtained by the digital rights management component 100 from a digital certificate, such as the digital certificates described above (e.g., an X.509 certificate in PKI). In various embodiments, the asymmetric decryption function performed by the digital rights management component 100 may correspond to (and/or be the same as) the asymmetric encryption function performed by the signature generation component as described above with respect to FIG. 3. The digital rights management component 100 may be configured to compare hash 402 with the result of the decryption function (illustrated as decryption result 404) to determine whether hash 402 and decryption result 404 are equivalent to each other (e.g., determine whether they are bit-wise equivalents). As illustrated, if digital rights management component 100 determines that hash 402 and decryption result 404 are equivalent to each other, digital rights management component 100 may determine that the digital signature is valid (i.e., the digital signature was generated by the signature generation component 108 and/or an entity controlling component 108). As illustrated, if digital rights management component 100 determines that hash 402 and decryption result 404 are not equivalent to each other, digital rights management component 100 may determine that the digital signature is invalid (i.e., the digital signature was not generated by the signature generation component 108 and/or an entity controlling component 108).

If the digital signature is invalid, the digital right management component 100 and/or the content consumption component 102 may be configured to prevent access to the content associated with the license. By enforcing this restriction, the digital rights management component may prevent the removal of user information (e.g., a licensed individual's name) from the license 200. For example, if the user information 202 were changed (e.g., with a hex editor), hash 402 would not be equivalent to decryption result 404 and the digital rights management component would determine that the license is invalid and thus prevent access to the corresponding content (according to some embodiments). In embodiments where private key 301 is secure and digital rights management component prohibits access to content if the digital signature is invalid, there may be no conceivable way for unscrupulous individuals to change the contents of the license (e.g., by erasing or changing user information in the license).

Returning to FIG. 1, if the digital rights management component determines that the digital signature is valid, the digital rights management component and/or content consumption component 102 may submit a request (as illustrated by data flow 30) to a content distribution component 116 for the encrypted content. The content distribution company may provide an encrypted version of the requested content (after any necessary authentication procedures, if any), as illustrated by data flow 32. In various embodiments, the request for content 30 may be based on content information 208 of license 200. For instance, the request may specify an identifier of the content or specify a memory location or network location at which the content is located, which may include but is not limited to Uniform Resource Locators (URLs), Uniform Resource Names (URNs), or some other Uniform Resource Identifier (URI). In some cases, the request may be formatted to automatically download the encrypted content from such locations. It should be noted that the content information 208 (e.g., a URL of the content) cannot be spoofed or modified (e.g., with a hex editor) since that would invalidate the digital signature of the license.

Prior to or during the presentation of content (e.g., display of an e-book, playing of a music or movie file, etc.), the digital rights management component 100 may be configured to output a message (e.g., via a display or speaker or other device) by sending the appropriate output data and/or instructions to I/O component 104. Such message may include user information 202, portions of user information 202, information derived from user information 202, or some combination thereof. For example, the message might display the licensed user's name by creating a text-based message that states "this e-book is licensed to John Doe." Such message may protect licensed content in a variety of ways. As described above, a user may be less prone to sharing licensed content with unlicensed individuals since sharing such content may effectively require the licensed user to reveal their user information to the unlicensed individuals (e.g., via the above-described message). Additionally, unlicensed individuals that obtain content licensed to others may decide not to consume the content upon being notified that the content is licensed to another individual. In many cases, the forced presentation of user information upon a content access attempt may serve as a deterrent to both the sharing of content with unlicensed individuals and the consumption of content licensed to other individuals. Also note that in various embodiments, the message described above may be delivered via the same channel in which the content is consumed. For instance, if the content is being viewed on a display (e.g., an e-book), then the message may also be generated on such display. In another example, if the content is being broadcast through a speaker, the message may take the form of an audio message broadcast through the speaker. In various embodiments, this may ensure that the user that is attempting to view the content will be aware of such message.

In some embodiments, the digital rights management component may construct the message such that a user is required to answer a question about the user information and/or their identity prior to viewing the content. In this way, if licensed content were to be accessed by a user that is not licensed to access the content, the user would be forced to view the name of the licensed individual (or some other user information) or, alternatively, be forced to view and answer a question including such user information. One such question might be "Are you John Doe, the licensed user of this content?" or "Are you an employee of Acme corporation, the business that licensed this content." Various examples of such messages are illustrated in FIGS. 7A and 7B described below. If the user does not answer affirmatively to such questions, the digital rights management component may direct the user to a location (e.g., a website) in which the user may purchase the license for the content. For instance, the digital rights management component may generate a message that specifies a network location (e.g., URL) of an e-commerce website for purchasing a license for the content. The above-described message is illustrated in FIG. 1 as data flow 34. Additionally, the user response to such message (if applicable) is illustrated as data flow 36.

Figure 5:
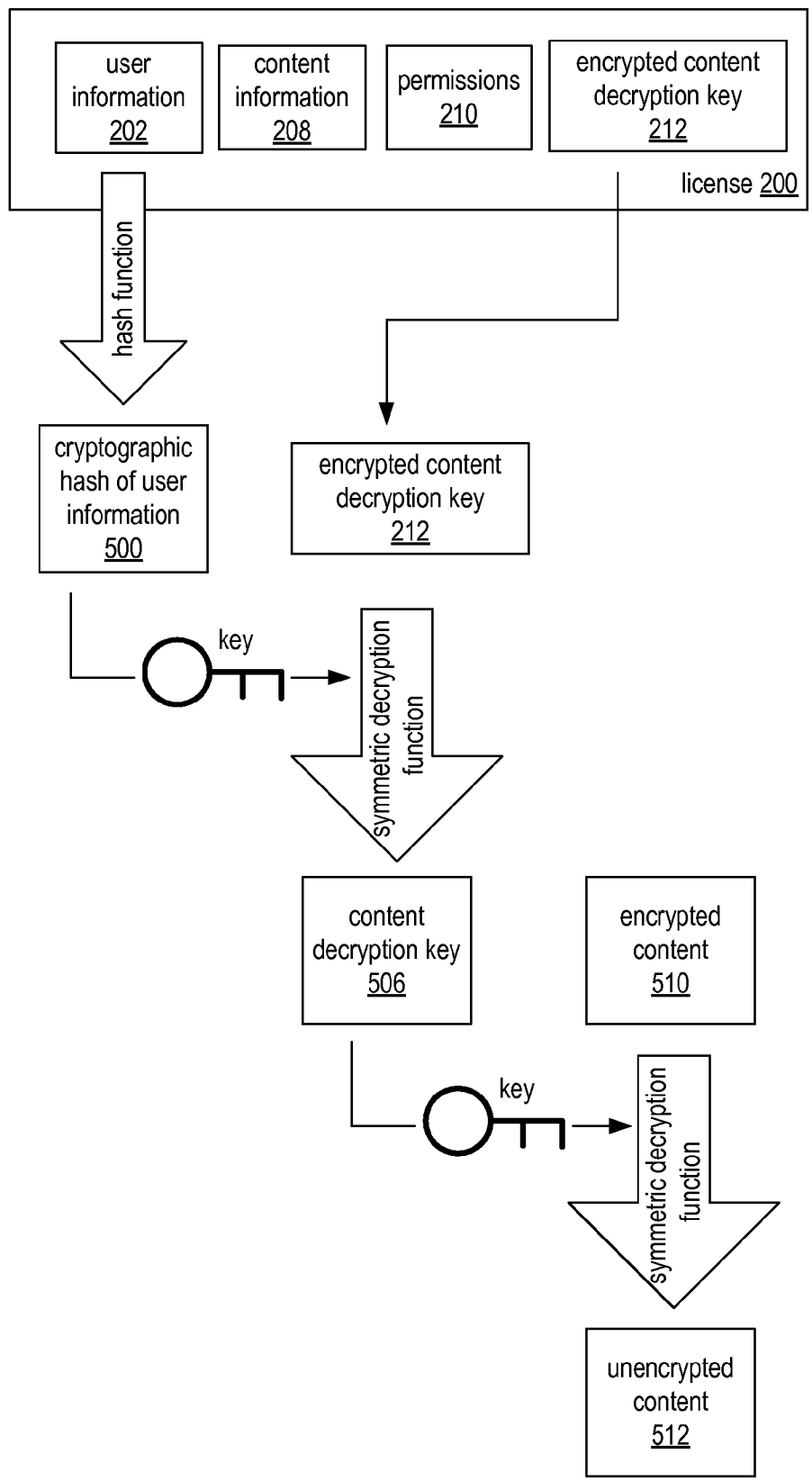
FIG. 5 illustrates a flow diagram for decrypting electronic content, according to various embodiments.

The content that is acquired via data flow 32 may be in an encrypted form. Accordingly, the digital rights management component may be configured to decrypt such content (if the digital signature is determined to be valid, as described above). FIG. 5 illustrates the manner in which the digital rights management component 100 may decrypt the encrypted content to generate an unencrypted version of the content suitable for consumption.

As illustrated by FIG. 5, the digital rights management component may be configured to perform a cryptographic hash function (e.g., SHA-1) on user information 202 of the license 200. The result of such operation is illustrated as cryptographic hash of user information 500. In various embodiments, such hash function may be the same hash function utilized to generate cryptographic hash of user information 204 described above with respect to FIG. 2. The digital rights management component 100 may also be configured to decrypt the encrypted content decryption key with a symmetric decryption function (which may be the same as the symmetric encryption function used to generate the encrypted content decryption key). The digital rights management component may be configured to utilize cryptographic hash of user information 500 as the key for such symmetric decryption function. The result of such decryption is illustrated as content decryption key 506. Note that in various embodiments the content decryption key 506 will only be correct if the digital signature 300 of the user information 202 has not been tampered with, such as by hex editor (e.g., since that same user information was used to for the encryption illustrated in FIG. 2). Also note that the symmetric decryption algorithm of FIG. 5 may in some cases be a cipher that is the same as a cipher that implemented the symmetric encryption algorithm of FIG. 2.

As demonstrated by the illustrated embodiment, encrypted content 510 (which may be the content acquired via data flow 32) may be decrypted by the digital rights management component with a symmetric decryption function in order to generate unencrypted content 512. As illustrated, content decryption key 506 (which, if correct, is the same as content decryption key 206 of FIG. 2) may be utilized as the decryption key in such decryption process. If the encryption key is correct (e.g., if the user information 202 has not been tampered with), the result of the decryption process may be unencrypted content 512 (which may be provided as output to a user as data flow 38). Also note that the symmetric decryption function utilized to generate unencrypted content 512 may be a cipher that is the same as a cipher used to originally encrypt the content.

The digital rights management component may permit unencrypted content 512 to be consumed on content consumption component 102, which may be implemented via any of the various devices described herein (e.g., laptop, e-book reader, MP3 player, etc.), according to various embodiments. Note that in some embodiments, the digital rights management component may enforce on the content permissions specified in the permissions data 210 of license 200. For example, permissions may specify who can access the content (e.g., an individual or group) and/or how the content may be viewed, listened, played, copied, pasted, cut, shared or otherwise utilized. The digital rights management component may restrict access to the unencrypted content in accordance with such permissions. The permissions may also specify a period of time for which the license is valid. Accordingly, the digital rights management component may be configured to prohibit access to the unencrypted content outside of such period of time. Also note that the digital rights management component may be configured to ensure that permissions data 210 has not been tampered with. For instance, if permissions data 210 has been tampered with, the digital rights management component may determine that the digital signature is no longer valid. If such permissions data has been tampered with, the digital rights management application may prevent access to the electronic content.

Example Method

Figure 6:
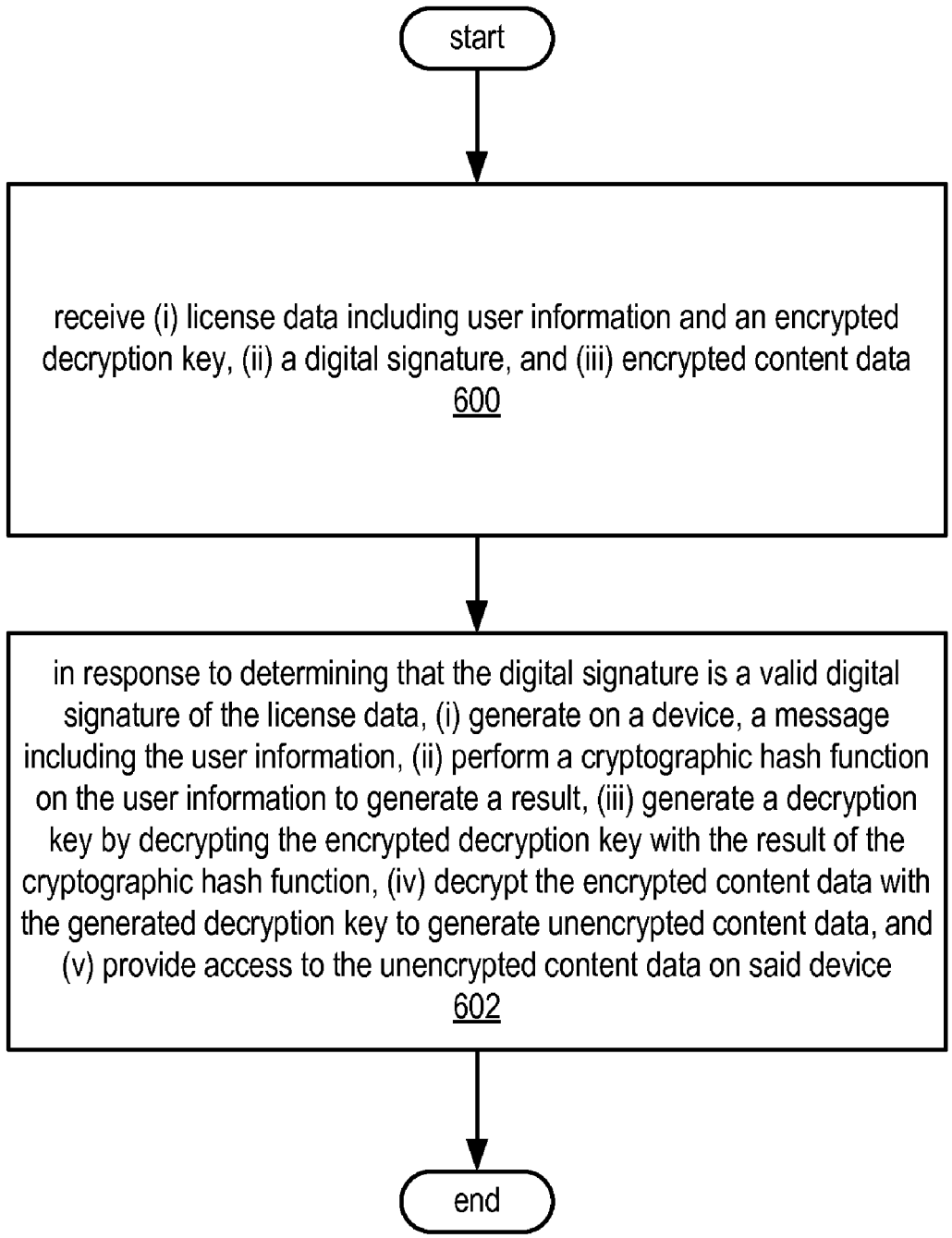
FIG. 6 illustrates a flowchart of an exemplary method that may be implemented by a digital rights management component, according to various embodiments.

The system and method for digital rights management using digital signatures may include various methods, an example flowchart of which is illustrated in FIG. 6. In various embodiments, the method illustrated in FIG. 6 may be implemented by the digital rights management component described herein. As illustrated by block 600, the illustrated method may include receiving license data including user information and an encrypted decryption key. One example of such license data may include license data 300 described above. Additionally, one example of such user information may include user information 202, which may include but is not limited to a user's name, address, phone number, workplace, occupation, affiliations, a transaction number or code identifying the purchase of the content, some combination thereof, or some other information from which the identity of the user acquiring content may be determined or derived. Such license data may also include an encrypted decryption key, such as encrypted content decryption key 212 described above. As illustrated, the method may also include receiving a digital signature, one example of which is illustrated as digital signature 300 of FIGS. 3 and 4. The method may also include receiving encrypted content data, an example of which is illustrated as encrypted content data 510 described above. In general, such content may include an encrypted version of any of the content described herein.

As illustrated by block 602, the method may also include performing various actions in response to determining that the received digital signature is valid. One example of determining that a digital signature is valid is illustrated in FIG. 4. The method may also include generating on a device, a message including the user information. For instance, the user information might include a licensed individual's name, and the method may include generating a message that includes such name on a device (e.g., an e-book reader or laptop computer). The method may also include performing a cryptographic hash function on the user information to generate a result and generating a decryption key by decrypting the encrypted decryption key with the result of the cryptographic hash function; an example of this portion of the method is illustrated above with respect to FIG. 5. The method may also include decrypting the encrypted content data to generate unencrypted content data and providing access to the unencrypted content data on said device, an example of this portion of the method is illustrated above with respect to FIGS. 1 and 5. In various embodiments, providing access to the unencrypted content may include generating a representation of at least a portion of the unencrypted content on a device (e.g., an e-book reader, a display, an MP3 player, etc.).

Example System Configuration

FIG. 7 illustrates an example system configuration according to one embodiment of the system and method for digital rights management using digital signatures. In the illustrates embodiment, host systems 702-714 may be configured to implement the various components described above with respect to FIG. 1. Each of host system 702-714 may be implemented by a variety of special purpose computers systems, including but not limited to desktop, laptop, or server computers systems. In some embodiments, some of such host systems may be implemented on a variety of other devices, such as an e-book reader, a digital audio player, a PDA, a mobile phone, a smartphone, a digital photo frame, or any other device or system configured to access, view, read, write, and/or manipulate any of content data described herein. Additionally, data store 714 may be implemented as a database or other system configured to store content data (such as the encrypted content data described herein). Additionally, any of such host systems may communicate to one another via network 700, which may be a local area network (LAN), a wide area network (WAN) (e.g., the Internet), some other network configured transport electronic data, or some combination thereof.

Example System

Various embodiments of a system and method for digital rights management using digital signatures, as described herein, may be executed on one or more computer systems, which may interact with various other devices. One such computer system is computer system 800 illustrated by FIG. 8, which may in various embodiments implement any of the components illustrated in FIG. 1. Computer system 800 may be capable of implementing a digital rights management component, such as digital rights management component 100, content consumption component 102, and browser component 106, which may be stored in memory as processor-executable program instructions. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, data 832 may include various images, such as images 130 and 430 described above. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a digital rights management component 100, content consumption component 102, and browser component 106 (as described above), are shown stored within system memory 820 as digital rights management component 100, content consumption component 102, and browser component 106, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network (e.g., network 780) and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 780), such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822 configured to implement a digital rights management component 100, content consumption component 102, and browser component 106. In one embodiment, any of digital rights management component 100, content consumption component 102, and browser component 106 may implement the methods described above, such as the methods illustrated by FIG. 6. In other embodiments, different elements and data may be included.

Those skilled in the art will appreciate that computer system 800 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of the invention as defined in the claims that follow.

What is claimed is:

1. A system, comprising:
a memory; and
one or more processors coupled to the memory, wherein the memory comprises program instructions executable by the one or more processors to implement a digital rights management component configured to:
  receive:
    license data comprising user information and an encrypted decryption key, the license data previously generated by a license management component,
    a digital signature, and
    encrypted content data; and
  subsequent to receiving the license data and in response to determining that the digital signature is a valid digital signature of the license data:
    generate, on a device, a message that includes both the user information, from the license data, and an inquiry for determining whether a viewer of the inquiry is a user specified by the user information as being licensed to access an unencrypted version of the encrypted content data,
    perform a key derivation function on the user information to generate a result,
    generate a decryption key by decrypting said encrypted decryption key with said result of the key derivation function, and decrypt the encrypted content data with said generated decryption key to generate unencrypted content data.

2. The system of claim 1, wherein said license data further comprises permissions data specifying permissions for the unencrypted content data, wherein the digital rights management component is configured to enforce one or more permissions on the unencrypted content data in accordance with said permissions data.

3. The system of claim 1, wherein the digital rights management component is configured to receive a response to said message indicating said inquiry and, based on that response, provide access to the unencrypted content data on said device.

4. The system of claim 1, wherein the digital rights management component is configured to receive a response to said message indicating said inquiry, wherein said response indicates a user does not have a license to encrypted content data; wherein the digital rights management component is configured to generate an other message specifying an instruction for obtaining a license to the encrypted content data.

5. The system of claim 1, wherein to determine that said digital signature of the license data is valid, the digital rights management component is configured to:
decrypt the digital signature with a public key to determine a first result;
perform a cryptographic hash function on said license data to determine a second result; and
determine that said first result is equivalent to said second result.

6. The system of claim 5, wherein said public key corresponds to a private key previously utilized to generate said digital signature.

7. The system of claim 1, wherein said key derivation function comprises at least one instance of a cryptographic hash function.

8. The system of claim 1, wherein to decrypt said encrypted decryption key with said result of the key derivation function, the digital rights management component is configured to perform a symmetric decryption function, wherein said result of the key derivation function is utilized by the digital rights management component as a decryption key to said symmetric decryption function.

9. The system of claim 1, wherein to decrypt the encrypted content data, the digital rights management component is configured to perform a symmetric decryption function, wherein the generated decryption key is utilized by the digital rights management component as a decryption key to said asymmetric decryption function.

10. A computer-implemented method comprising:
performing, by one or more computers:
receiving:
license data comprising user information and an encrypted decryption key, the license data previously generated by a license management component,
a digital signature, and
encrypted content data; and
subsequent to receiving the license data and in response to determining that the digital signature is a valid digital signature of the license data:
generating, on a device, a message that includes both the user information, from the license data, and an inquiry for determining whether a viewer of the inquiry is a user specified by the user information as being licensed to access an unencrypted version of the encrypted content data,
performing a key derivation function on the user information to generate a result,
generating a decryption key by decrypting said encrypted decryption key with said result of the key derivation function, and
decrypting the encrypted content data with said generated decryption key to generate unencrypted content data.

11. The method of claim 10, wherein said license data further comprises permissions data specifying permissions for the unencrypted content data, wherein the method comprises enforcing one or more permissions on the unencrypted content data in accordance with said permissions data.

12. The method of claim 10, wherein the method comprises receiving a response to said message indicating said inquiry and, based on that response, providing access to the unencrypted content data on said device.

13. The method of claim 10, wherein the method comprises receiving a response to said message indicating said inquiry, wherein said response indicates a user does not have a license to encrypted content data; wherein the method further comprises generating an other message specifying an instruction for obtaining a license to the encrypted content data.

14. The method of claim 10, wherein determining that the license data is valid comprises:
decrypting the digital signature with a public key to determine a first result;
performing a cryptographic hash function on said license data to determine a second result; and
determining that said first result is equivalent to said second result.

15. The method of claim 14, wherein said public key corresponds to a private key previously utilized to generate said digital signature.

16. The method of claim 10, wherein said key derivation function comprises at least one instance of a cryptographic hash function.

17. The method of claim 10, wherein decrypting said encrypted decryption key comprises performing a symmetric decryption function, wherein the method further comprises utilizing the result of the key derivation function as a decryption key to said symmetric decryption function.

18. The method of claim 10, wherein decrypting the encrypted content data comprises performing a symmetric decryption function, wherein the method further comprises utilizing the generated decryption key as a decryption key to said asymmetric decryption function.

19. A non-transitory computer-readable storage medium, storing program instructions computer-executable to implement a digital rights management component configured to:
receive:
license data comprising user information and an encrypted decryption key, the license data previously generated by a license management component,
a digital signature, and
encrypted content data; and
subsequent to receiving the license data and in response to determining that the digital signature is a valid digital signature of the license data:
generate, on a device, a message that includes both the user information, from the license data, and an inquiry for determining whether a viewer of the inquiry is a user specified by the user information as being licensed to access an unencrypted version of the encrypted content data, perform a key derivation function on the user information to generate a result, generate a decryption key by decrypting said encrypted decryption key with said result of the key derivation function, and decrypt the encrypted content data with said generated decryption key to generate unencrypted content data.

20. The medium of claim 19, wherein said license data further comprises permissions data specifying permissions for the unencrypted content data, wherein the digital rights management component is configured to enforce one or more permissions on the unencrypted content data in accordance with said permissions data.

21. The medium of claim 19, wherein the digital rights management component is configured to receive a response to said message indicating said inquiry and, based on that response, provide access to the unencrypted content data on said device.

22. The medium of claim 19, wherein the digital rights management component is configured to receive a response to said message indicating said inquiry, wherein said response indicates a user does not have a license to encrypted content data; wherein the digital rights management component is configured to generate an other message specifying an instruction for obtaining a license to the encrypted content data.

23. The medium of claim 19, wherein to determine that said digital signature of the license data is valid, the digital rights management component is configured to:

decrypt the digital signature with a public key to determine a first result;

perform a cryptographic hash function on said license data to determine a second result; and determine that said first result is equivalent to said second result.

24. The medium of claim 23, wherein said public key corresponds to a private key previously utilized to generate said digital signature.

25. The medium of claim 19, wherein said key derivation function comprises at least one instance of a cryptographic hash function.

26. The medium of claim 19, wherein to decrypt said encrypted decryption key with said result of the key derivation function, the digital rights management component is configured to perform a symmetric decryption function, wherein said result of the key derivation function is utilized by the digital rights management component as a decryption key to said symmetric decryption function.

27. The medium of claim 19, wherein to decrypt the encrypted content data, the digital rights management component is configured to perform a symmetric decryption function, wherein the generated decryption key is utilized by the digital rights management component as a decryption key to said asymmetric decryption function.

28. A system, comprising:

a memory; and one or more processors coupled to the memory, wherein the memory comprises program instructions executable by the one or more processors to implement a license management component configured to:

perform a key derivation function on user information to determine an encryption key;

encrypt a decryption key with the generated encryption key to generate an encrypted decryption key;

generate a license comprising said user information, said encrypted decryption key, and information specifying a requirement to convey an inquiry for determining whether a viewer of the inquiry is a user specified by the user information as being licensed to access an unencrypted version of content protected by the license; and obtain a digital signature of said license such that the user information of said license cannot be modified without invalidating the digital signature.

29. The system of claim 28, wherein the license management component is configured to provide said digital signature and said license to an e-commerce computer system controlled by a merchant, wherein said e-commerce computer system is configured to perform a transaction for the sale of electronic content to which the license is associated.

30. The system of claim 28, wherein the license management component is configured to provide said digital signature and said license to a client computer system configured to validate said digital signature and provide access to electronic content in response to that validation.

31. A computer-implemented method, comprising:

performing, by one or more computers:

executing instructions on a specific apparatus so that binary digital electronic signals representing license data comprising user information and an encrypted decryption key are received;

executing instructions on said specific apparatus so that binary digital electronic signals representing a digital signature and encrypted content data are received, wherein the user information of the license data cannot be modified without invalidating the digital signature;

executing instructions on said specific apparatus to determine that the digital signature is a valid digital signature of the license data;

executing instructions on said specific apparatus to, subsequent to receiving the license data and in response to said determination:

generate on a device, a message including the user information and an inquiry for determining whether a viewer of the inquiry is a user specified by the user information as being licensed to access an unencrypted version of the encrypted content data; perform a key derivation function on the user information to generate a result, generate a decryption key by decrypting said encrypted decryption key with said result of the key derivation function, and decrypt the encrypted content data with said generated decryption key to generate unencrypted content data; and storing the unencrypted content data in a memory location of said specific apparatus.

\* \* \* \* \*